United States Patent [19]

Tannehill

[11] 4,079,867

[45] Mar. 21, 1978

[54] SOAP DISPENSER

[76] Inventor: Marlin T. Tannehill, 305-3 Ave. SW., Dickinson, N. Dak. 58601

[21] Appl. No.: 714,898

[22] Filed: Aug. 16, 1976

[51] Int. Cl.² ............................................. G01F 11/24
[52] U.S. Cl. .................................................. 222/368
[58] Field of Search .................. 222/368, 43, 44, 185; 141/383, 386

[56] References Cited

U.S. PATENT DOCUMENTS

| 323,413 | 8/1885 | Gibson | 222/368 X |
|---|---|---|---|
| 1,493,005 | 5/1924 | Snow | 222/185 |
| 2,290,677 | 7/1942 | Delaney | 141/386 X |
| 2,401,684 | 6/1946 | Gumilar | 222/368 X |
| 3,261,503 | 7/1966 | Cassidy | 222/368 X |

Primary Examiner—Stanley H. Tollberg

Attorney, Agent, or Firm—Shlesinger, Arkwright, Garvey and Dinsmore

[57] ABSTRACT

A dispenser for soap or the like comprising a hopper having a lower discharge outlet and a rotatable metering device within the outlet including a plurality of circumferentially arranged chambers which sequentially communicate with the hopper and the discharge opening as they are rotated. The metering device includes a manually operated knob including a spring loaded detent extending rearwardly therefrom and cooperating with a plurality of recesses on the front panel of the hopper. A holder for a cup or the like is provided beneath the discharge outlet of the hopper so that the dispensed soap may be transferred to the washing machine.

2 Claims, 5 Drawing Figures

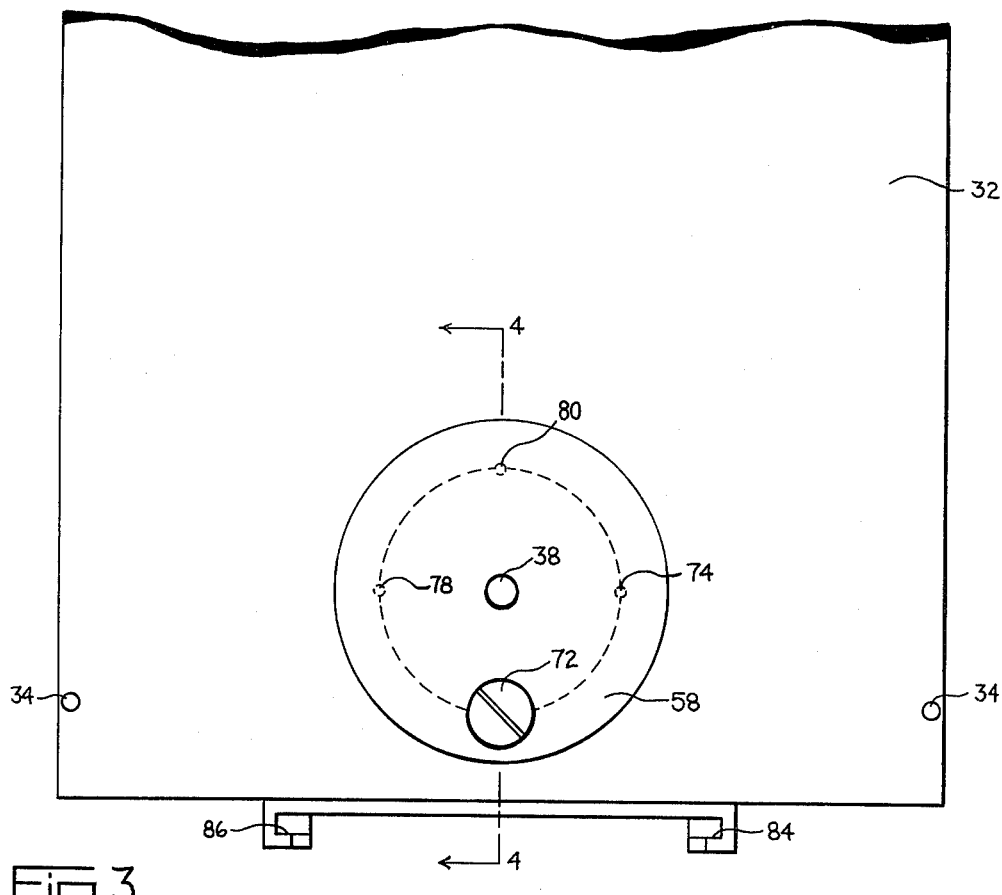
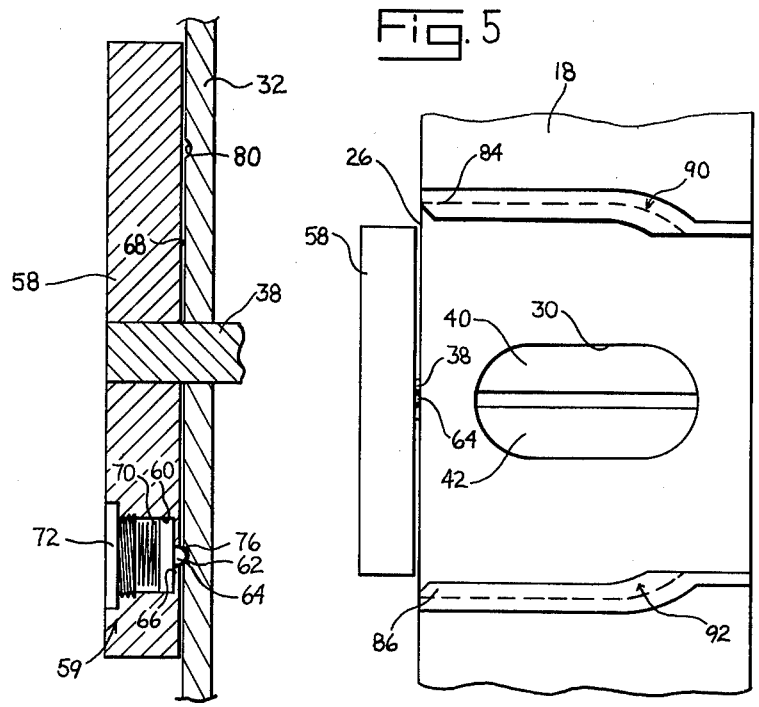

SOAP DISPENSER

BACKGROUND OF THE INVENTION

The invention relates to a dispenser for powdered substances such as soap or the like which are customarily packaged in rectangular cardboard boxes.

Dish and clothes washing detergents of the powdered form are conventionally packaged in rectangular cartons having an opening located near one of the upper corners. The product is dispensed by tilting the carton thereby causing the powdered substance to flow through the opening or spout and often results in a certain amount of spillage, especially in the case where it must be poured into a measuring cup prior to addition to the washing machine. Furthermore, such containers for soap are normally quite large and bulky and therefore susceptible to being inadvertently knocked over, again causing spillage of the product. Since many of today's detergents are in highly concentrated form, it is also important that they be accurately measured and dispensed so that damage to the machines through excess sudsing is avoided.

To avoid the problems mentioned above, it is desirable to provide a soap dispenser having a hopper and lower discharge outlet with means for metering the quantity of soap dispensed. Although dispensers generally of this type are quite common, none of them provide means for accurately indexing the metering device which is both simple in construction and located such that it can operate without interference from the soap which is being dispensed.

OBJECTS OF THE INVENTION

It is an object of the present invention to provide a dispenser for powdered material wherein the hopper and metering chamber are integral and include partitions at the base of the hopper and around the metering chamber forming chambers to either side of the metering chamber to strengthen and rigidify the structure.

It is a further object of the present invention to provide a dispenser for powdered material which is compact, simple in construction and pleasing in appearance.

Another object of the present invention is to provide a dispenser for powdered material including indexing means which provides an audible and tactile indication when it is indexed to the next position.

A further object of the present invention is to provide a dispenser for powdered material which includes a metering device having means for indexing separated from the material being dispensed so that interference and clogging is minimized.

Yet another object of the present invention is to provide a dispenser for powdered material which includes a hopper of a size and shape adapted to receive a conventional rectangular container for such material.

These and other objects and advantages will become apparent from the following description and drawings.

SUMMARY OF THE INVENTION

A dispenser for soap or the like comprising a hopper including a rear wall, two side walls and a bottom, a discharge outlet beneath the hopper, the bottom having at least two opposite surfaces inclined downwardly toward the discharge outlet, the discharge outlet including a generally cylindrical chamber having an upper opening in communication with the hopper and the lower opening located beneath the upper opening, a cylindrical metering drum rotatably mounted in the chamber and including a plurality of chambers circumferentially spaced about a central shaft and arranged to sequentially communicate with the upper opening and to sequentially communicate with the lower opening as the drum rotates, means on the dispenser for supporting a receptacle beneath the discharge outlet, a front panel covering the hopper and chamber, the shaft extending through the front panel and having a knob thereon which includes a back adjacent the front panel and a spring biased detent, and a plurality of recesses on the front panel behind the knob which are arranged to be sequentially engaged by the detent as the knob is rotated.

BRIEF DESCRIPTION OF THE DRAWINGS

FIG. 3 is an enlarged fragmentary front view of the lower portion of the dispenser;

FIG. 4 is a sectional view of FIG. 3 taken along line 4—4 and viewed in the direction of the arrows; and FIG. 5 is an enlarged fragmentary bottom view of the dispenser.

DETAILED DESCRIPTION

Figures 1, 2:
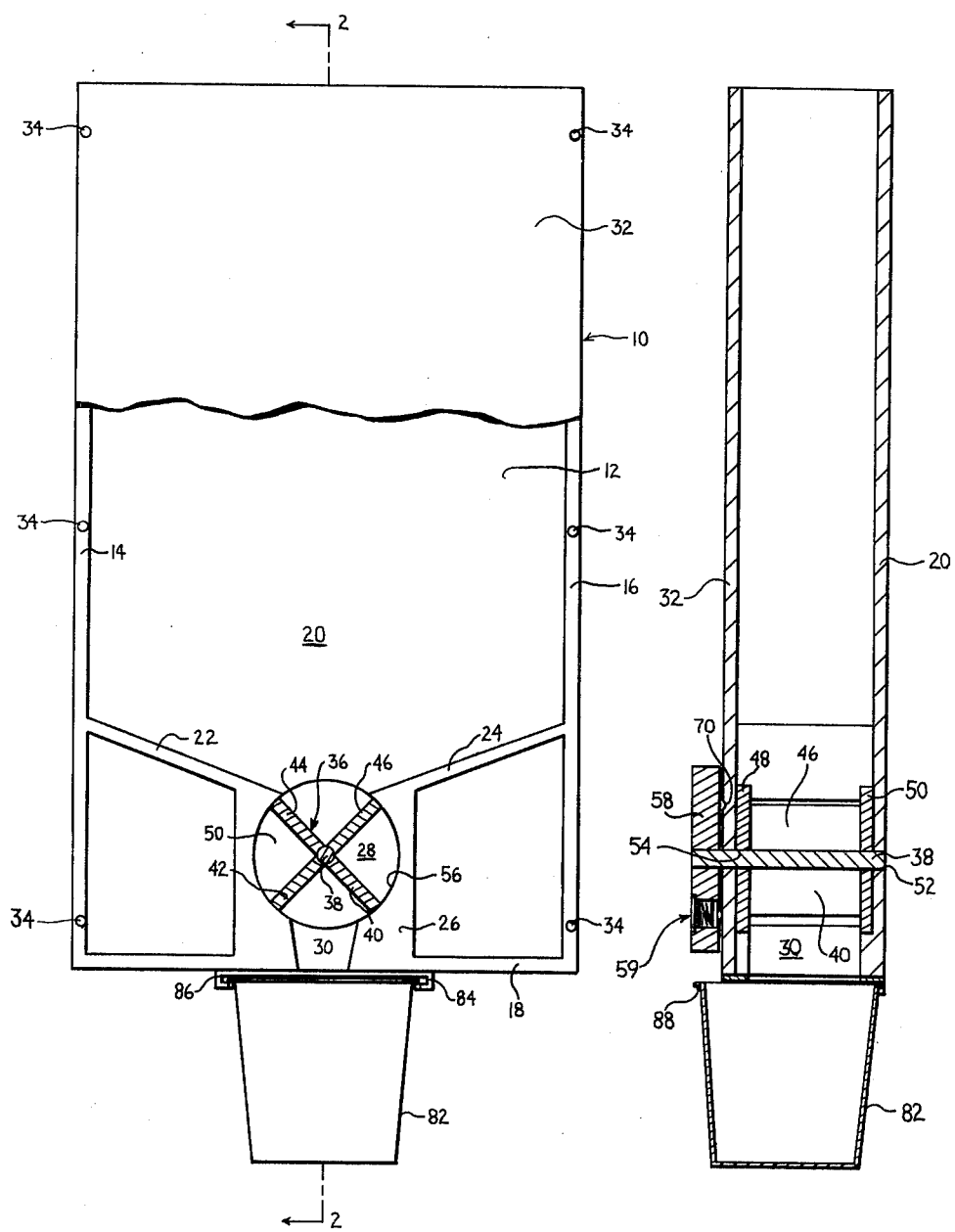
FIG. 1 is a front elevational view with the front panel broken away to illustrate the details of the hopper and metering drum.
FIG. 2 is a sectional view of FIG. 1 taken along line 2—2 and viewed in the direction of the arrows.

The dispenser of the present invention generally comprises a container 10 of rectangular cross section having a rear wall 12, side walls 14 and 16 and a bottom wall 18 which are preferably integral and made of a suitable plastic or it may be a unitary metal casting of aluminum, steel or the like. The lower portion of the hopper 20 is formed by a pair of downwardly inclined converging bottom walls or partitions 22 and 24 and housing 26 having a cylindrical metering chamber 28 therein and a discharge opening 30. Partitions 22 and 24 and housing 26 are preferably integral with rear, side and bottom walls 12, 14, 16 and 18 so as to lend strength and rigidity to the dispenser. Partitions 22 and 24 and housing 26 form chambers on either side of the metering chamber 28.

A separate front panel 32 encloses the front of hopper 20 and metering chamber 28 and is attached to side walls 14 and 16 by means of bosses 34. Alternatively, front panel 32 may be bolted or adhesively connected to side walls 14 and 16 and bottom wall 18. The top of hopper 20 is preferably open so as to receive a full detergent box.

Mounted within cylindrical metering chamber 28 is a metering drum 36 which comprises a central shaft 38 and a plurality of vanes 40, 42, 44 and 46 connected to shaft 38 and extending radially therefrom. A pair of circular end plates 48 and 50 are secured to shaft 38 and the ends of vanes 40, 42, 44 and 46 so as to form a plurality of circumferentially arranged chambers. If desired, vanes 40, 42, 44 and 46 and end plates 48 and 50 may be formed integrally with shaft 38. Shaft 38 is rotatably supported within chamber 28 by means of circular bores 52 and 54 in rear wall 20 and front panel 32 respectively. Vanes 40, 42, 44 and 46 are dimensioned such that they contact the cylindrical inner surface 56 of chamber 28 as they rotate.

A hand operated knob 58 is fastened to shaft 38 and includes a detent 59 comprising a bore 60 in which a pin 62 is slideably received. Pin 62 includes a protruding portion 64 which extends through an aperture 66 on the back 68 of knob 58. A spring 70 and screw 72 maintain pin 62 in its extended position. Front panel 32 is provided with a plurality of recesses 74, 76, 78 and 80 which are sequentially engaged by protruding portion 64 of pin 62 as knob 58 is rotated. The recesses 74, 76, 78 and 80 are positioned such that pin 62 snaps into one of them each time drum 36 assumes a position similar to that illustrated in FIG. 1. Since the indexing mechanism comprising detent 59 and recesses 74, 76, 78 and 80 is located exterior to metering chamber 28 and hopper 20, there is no chance for it to become clogged or otherwise interfered with by the dispensed material. Furthermore, the indexing mechanism is positioned behind knob 58 so that it does not detract from the appearance of the dispenser.

A cup 82 may be supported beneath discharge opening 30 by means of tracks 84 and 86 which are adapted to engage its flanged rim 88. Tracks 84 and 86 are curved at points 90 and 92 so that cup 82 may be properly positioned underneath discharge opening 30.

The dispenser operates in the following manner. Laundry detergent or other powdered material is either poured directly into hopper 20 or the opened carton is placed therein in inverted position so that the material empties into hopper 20 as the carton is emptied. Cup 82 is positioned beneath discharge opening 30 by sliding it rearwardly on tracks 84 and 86. Knob 58 is then rotated either clockwise or counterclockwise so as to cause one of the chambers defined by vanes 40, 42, 44 and 46 to register with hopper 20. This will cause the compartment to be filled with soap and as knob 58 is rotated further to the subsequent position wherein detent 62 engages the next recess 74, 76, 78 or 80, the filled compartment will be rotated 90° and the following compartment placed in registration with hopper 20 so that it is filled. When the knob is rotated another quarter turn, the previously filled compartment will register with discharge opening 30 so that the soap contained therein will fall into cup 82. The procedure may be continued until the desired quantity of soap has been collected in cup 82. For example, each compartment could be designed to hold two ounces of soap so that for each full rotation of knob 58, eight ounces of soap would be dispensed.

While this invention has been described as having a preferred design, it will be understood that it is capable of further modification. This application is, therefore, intended to cover any variations, uses or adaptations of the invention following the general principles thereof and including such departures from the present disclosure as come within known or customary practice in the art to which this invention pertains, and as may be applied to the essential features hereinbefore set forth and fall within the scope of this invention or the limits of the appended claims.

What is claimed is:

1. A dispenser for soap or the like, comprising:
   a rectangular container having front, rear, side and bottom walls;
   a partition in the lower portion of said container;
   a discharge outlet beneath said partition, said discharge outlet having an upper opening in said partition;
   said partition having at least two opposite surfaces inclined downwardly from said container side walls down to said upper opening of said discharge outlet;
   said discharge outlet including a generally cylindrical chamber in communication with said upper opening and having a lower opening located in said container bottom wall beneath said upper opening;
   a cylindrical metering drum rotatably mounted in said chamber and including a central shaft and a plurality of chambers circumferentially spaced about said shaft and arranged to sequentially communicate said plurality of chambers with said upper opening and to sequentially communicate said plurality of chambers with said lower opening as said drum rotates, said plurality of chambers including a plurality of vanes extending radially from said shaft, said shaft and said vanes being integrally formed;
   said shaft having a portion extending through said container front wall;
   a knob on said portion of said shaft extending through said container front wall, said knob having a back adjacent said container front wall with indexing means situated on said back of said knob and on said container front wall adjacent said knob for providing audible and tactile indication of the position of said drum;
   said container rear, side and bottom walls, said partition and said discharge outlet being integral;
   said container rear, side and bottom walls, said partition and said discharge outlet defining chambers on either side of said discharge outlet; and
   means on said container bottom wall adjacent said lower opening for supporting a receptacle beneath said lower opening, said supporting means having tracks adapted to engage the rim of the receptacle.

2. The dispenser of claim 1 wherein said tracks are substantially parallel at their forward ends and curved toward each other at their rearward ends and said curved rearward ends having stop means for the receptacle.

* * * * *